United States Patent Office 3,663,591
Patented May 16, 1972

3,663,591
CHRYSANTHEMIC ACID ESTERS
John Mervyn Osbond, Hatfield, and James Charles Wickens, St. Albans, England, assignors to Hoffmann-La Roche Inc., Nutley, N.J.
No Drawing. Filed Nov. 28, 1969, Ser. No. 880,964
Claims priority, application Great Britain, Dec. 9, 1968, 58,351/68, 58,352/68, 58,353/68, 58,354/68
Int. Cl. C07c 69/74; A01n 9/24
U.S. Cl. 260—468 P        19 Claims

ABSTRACT OF THE DISCLOSURE

The invention comprises chrysanthemic acid ester compounds of the formula

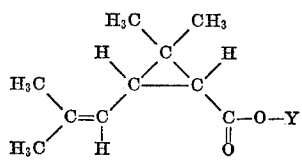

wherein Y is the moiety

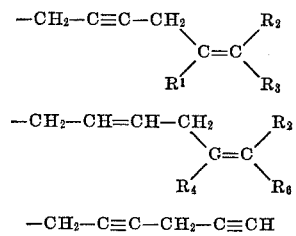

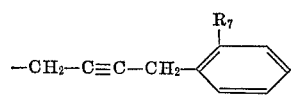

or

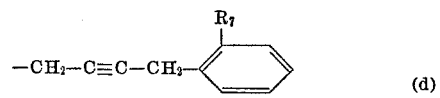

wherein $R^1$–$R_7$ is hydrogen or an alkyl group. The compounds of Formula I are useful as insecticides and are prepared by reacting an acid chloride with alcohol or by reacting a halide with a salt of a chrysanthemum carboxylic acid.

---

This invention relates to the esters of Formula I which are useful as insecticides. These esters can be incorporated into insecticidal compositions which contain as an active ingredient a chrysanthemic acid ester and a compatible carrier material.

The unique compounds of the present invention are represented by the formula

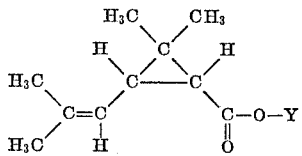

wherein Y is a moiety selected from the group consisting of

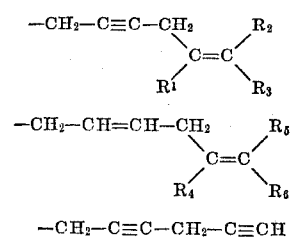

and

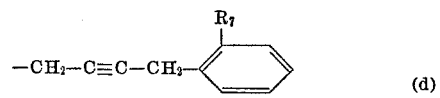

wherein $R^1$, $R_2$, $R_3$, $R_4$, $R_5$, $R_6$ and $R_7$ is each independently selected from the group consisting of a hydrogen atom and lower alkyl, at least one of $R^1$, $R_2$ and $R_3$ is other than hydrogen.

Although the chrysanthemic acid esters produced in accordance with this invention are particularly useful in combating *Musca domestica*, the compounds are also useful in that they exhibit significant insecticidal activity against bean aphids, red spider mite, codling moth and Colorado beetle while evidencing a relatively low mammalian toxicity. In fact, the significant insecticidal activity of the compounds of Formula I is surprising especially since Elliott et al. (Nature, 207, 938 [1965]) reported a related, but dissimilar ester to be non-toxic to undesirable insects such as mustard beetles and *Musca domestica*.

In accordance with custom and usage in the art, the third bond, optionally present in the structure of the moiety of Formula (d), is depicted by a broken line. Likewise, it will be understood that the term "lower alkyl" comprehends the use of both straight-chain and branched-chain alkyl groups containing anywhere from one to seven carbon atoms, e.g. methyl, ethyl, isopropyl and the like. In a preferred embodiment the "lower alkyl" group will represent a methyl group.

The chrysanthemic acid esters illustrated in Formula I comprise several classes of compounds. For example, the symbol Y can represent the moiety of Formula (a), in which case the esters would have the formula

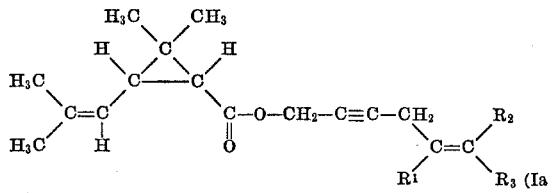

wherein $R^1$, $R_2$, and $R_3$ are of the same meaning as above defined, at least one of $R^1$, $R_2$ and $R_3$ is other than hydrogen.

Esters illustrative of this class are: 5-methyl-5-hexen-2-ynyl (±)-cis/trans-2,2-dimethyl - 3 - (2-methyl-propenyl)-cyclopropane carboxylate; and 5,6-dimethyl-5-hepten-2-ynyl (±)-cis/trans - 2,2 - dimethyl-3-(2-methylpropenyl)-cyclopropane carboxylate.

A second class of chrysanthemic acid esters of Formula I is the compounds in which Y is the moiety of Formula (b). In this instance, the esters would be represented by the formula

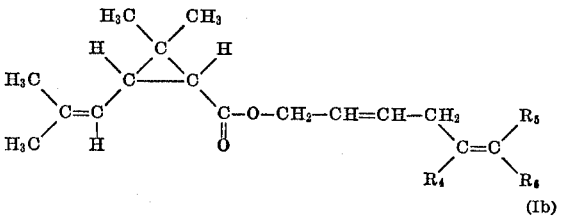

wherein $R_4$, $R_5$ and $R_6$ each individually represent a hydrogen atom or a lower alkyl group.

Preferably $R_4$, $R_5$ and $R_6$ will each represent a hydrogen atom or in another preferred embodiment of this class, one of the three symbols will represent a lower alkyl while the remaining two symbols each represent a hydrogen atom. Esters exemplary of this class are: cis-2,5-hexadienyl (±) - cis/trans-2,2-dimethyl-3-(2-methylpropenyl)-cyclopropane carboxylate; trans-2,5-hexadienyl (±)-cis/trans - 2,2 - dimethyl-3-(2-methyl-propenyl)-cyclopropane carboxylate; 2-trans-2,5-heptadienyl (±)-cis/trans-2,2-dimethyl-3-(2-methyl - propenyl)-cyclopropane carboxylate; and trans-5-methyl-2,5-hexadienyl (±)-cis/trans-2,2-dimethyl-3-(2-methyl - propenyl)-cyclopropane carboxylate.

In another class of compounds, Y can represent the aromatic containing moiety of Formula (c) wherein the esters would be represented by the formula

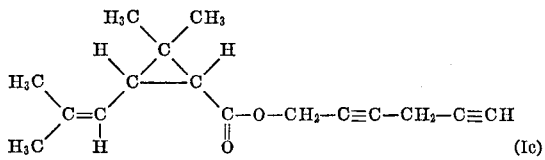

Illustrative of this class is, for example, the ester 2,5-hexadiynyl (±) - cis/trans-2,2-dimethyl-3-(2-methyl-propenyl)-cyclopropane carboxylate.

Furthermore, Y can represent the moiety of Formula (d) in which instance the esters would be of a class of the formula

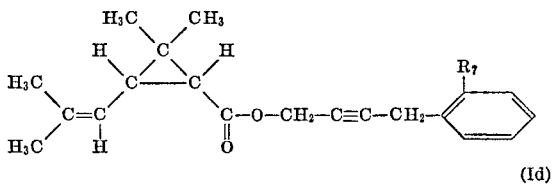

wherein $R_7$ is a hydrogen atom or a lower alkyl group.

Where $R_7$ represents a hydrogen atom, the esters within the class will include, for example, the compounds: 4-phenyl-2-butynyl (±)-cis/trans-2,2-dimethyl-3-(2-methyl-propenyl)-cyclopropane carboxylate and trans-4-phenyl-2-butenyl (±)-cis/trans-2,2-dimethyl-3-(2-methyl - propenyl)-cyclopropane carboxylate. If, however, $R_7$ were represented by a lower alkyl, and in particular by a preferred methyl group, an illustrative compound would be 4-(2-methyl-phenyl) - 2 - butynyl (±)-cis/trans-2,2-dimethyl-3-(2-methyl-propenyl)-cyclopropane carboxylate.

The chrysanthemic acid esters of Formula I can be prepared employing either one of two methods. Firstly, the esters can be produced by reacting an acid chloride of the formula

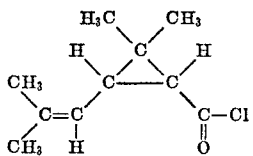

with an alcohol of the formula

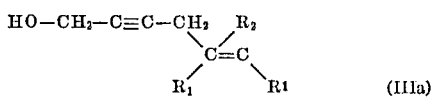

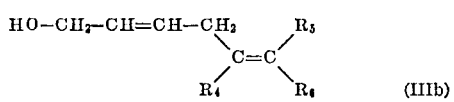

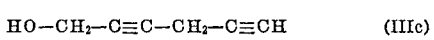

or

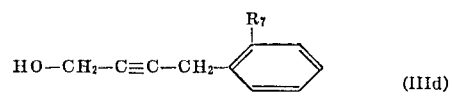

wherein $R_1$, $R_2$, $R_3$, $R_4$, $R_5$ $R_6$ and $R_7$ are as above described.

The reaction of an acid chloride starting material of Formula II with an alcohol starting material is conveniently carried out in the presence of an acid-binding agent.

Suitable acid-binding agents include alkali-metal carbonates, alkali-metal bicarbonates, tertiary amines and the like. For example, the acid-binding agent can be sodium carbonate, sodium bicarbonate or triethyl amine; preferably, pyridine is utilized.

In a preferred embodiment, the reaction is carried out in a reaction inert medium such as an inert solvent or inert gas. Where the reaction proceeds in the presence of an inert solvent, the inert solvent can be a hydrocarbon (e.g. benzene, toluene, xylene, etc.), a halogenated hydrocarbon (e.g. methylene chloride, chloroform, chlorobenzene etc.), ether (e.g. diethyl etc.) or the like. Furthermore, the reaction can be suitably carried out at a temperature range of from about 0° to about 30° C. Preferably, however, the reaction is carried out at a temperature of about 20° C. in the presence of an inert gas such as nitrogen or argon.

The acid chloride starting materials of Formula II are known and have already been described in the literature. For example, these materials can be prepared by chlorinating the corresponding carboxylic acid using thionyl chloride or the like.

The alcohol starting materials of Formula IIIa–IIId can be produced by a variety of methods. For example, the alcohols of Formula IIIa can be prepared by the method which comprises the reaction of propargyl alcohol with an alkyl-magnesium halide like ethyl magnesium bromide to form a Grignard complex, treating the Grignard complex with cuprous chloride or cuprous cyanide, treating the mixture with a halide of the formula

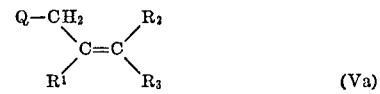

wherein $R^1$, $R_2$ and $R_3$ are as above defined and Q is a chlorine or bromine atom, and decomposing the resultant product by conventional techniques such as by treatment with aqueous ammonium chloride.

Alternatively, the alcohols of Formula IIIa can be prepared by simultaneously reacting a mixture of propargyl alcohol, cuprous chloride and sodium chloride in water with sodium hydroxide and a halide of Formula Va. In this regard see Ann. Chem. 658; 6–20, 1962. The alcohol of Formula IIIa can also be prepared by treating a mixture of propargyl alcohol, cuprous chloride and sodium carbonate in acetone with a halide of Formula Va. See Bull. Soc. Chim. France, 1957; 1966.

Preparation of the alcohol starting materials of Formula IIIb can be prepared by reducing an acetylenic alcohol of Formula IIIa (or a corresponding acetylenic alcohol) wherein $R^1$, $R_2$ and $R_3$ each represent a hydrogen atom, or $R^1$ represents a hydrogen atom and either $R_2$ or $R_3$ represent a hydrogen atom and the other symbol represents a lower-alkyl group either (1) with an alkali-metal aluminum hydride or (2) with hydrogen in the presence of a partially deactivated palladium catalyst. This reduction with an alkali-metal aluminum hydride such as lithium aluminum hydride yields an alcohol starting material of Formula IIIb having a trans configuration at the 2, 3-position. The reaction is conveniently carried out in an inert organic solvent like diethyl ether at an elevated temperature such as the reflux temperature of the reduction mixture. In contrast, reducing an alcohol of Formula IIIa in the presence of a partially deactivated palladium catalyst yields an alcohol starting material of Formula IIIb whose configuration is cis at the 2,3-position.

Deactivation of a palladium catalyst (e.g., Lindlar) can be effected according to known techniques using lead and quinoline in the presence of an inert organic solvent like petroleum ether.

The acetylenic alcohol starting materials of Formula IIIc and IIId can be prepared in similar manner to that employed for the preparation of the alcohols of Formula IIIa, i.e., reacting propargyl alcohol with a Grignard reagent followed by treatment with a halide of the formula

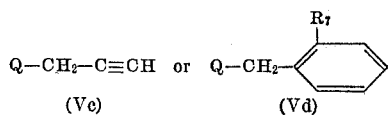

wherein Q and $R_7$ are as above defined, and decomposition of the resultant product by conventional techniques such as treatment with aqueous ammonium chloride.

Alternately, the acetylenic alcohols of Formula IIId can be prepared by reacting the corresponding aryl-magnesium halide (e.g. phenyl-magnesium bromide) with 4-chloro-2-butyn-1-ol and decomposing the product by conventional techniques such as by treatment with aqueous ammonium chloride.

Olefinic alcohol starting materials of Formula IIId can be prepared in a manner similar to that employed in preparing the alcohols of Formula IIIc, i.e., by reducing a corresponding acetylenic alcohol starting material *either* (1) with an alkali-metal aluminium hydride or (2) with hydrogen in the presence of a partially deactivated palladium catalyst. Where the reduction of the acetylenic alcohol is effected using an alkali-metal aluminium hydride (e.g. lithium aluminium hydride), the resultant product is an olefinic alcohol starting material of Formula IIId having a transconfiguration at the 2,3-position. This reaction may be carried out in an inert organic solvent at the reflux temperature of the reduction mixture.

In contrast, if the alcohol reduction procedure uses hydrogen in the presence of a partially deactivated palladium catalyst, the alcohol so produced is an olefin of Formula IIId which has a cis configuration at the 2,3-position.

The second procedure for preparing chrysanthemic acid esters of Formula I comprises reacting an alkali-metal salt or a tri(lower alkyl) amine salt of a chrysanthemum carboxylic acid with a halide of the formula

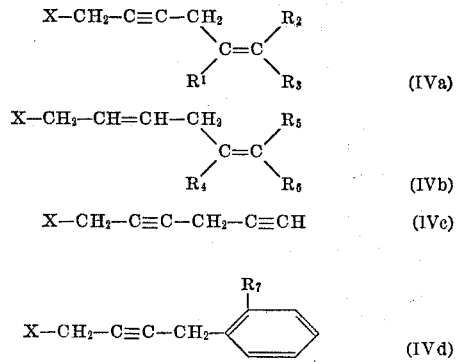

or wherein X is a halogen atom and $R^1$, $R_2$, $R_3$, $R_4$, $R_5$, $R_6$ and $R_7$ are as above defined.

The alkali-metal and tri(lower alkyl) amine salts used in this process are prepared by reacting a chrysanthemum carboxylic acid with an alkali-metal hydroxide solution or a tri(lower alkyl) amine in an inert reaction solvent like ethanol. The preferred salts of the alkali-metals are sodium and potassium and those of the tri(lower alkyl) amines are triethyl amine.

Preparation of the halide starting materials of Formulas IVa, IVb, IVc and IVd is by treating an alcohol of Formula IIIa, IIIb, IIIc or IIId with a halogenating agent (e.g. thionyl chloride, phosphorus tribromide in pyridine or sodium iodide in acetone). In a preferred embodiment, the halides are chlorides or bromides.

Suitably, the reaction of an alkali-metal salt or a tri(lower alkyl) amine salt of a chrysanthemum carboxylic acid with a halide of Formula IVa, IVb, IVc or IVd is carried out in an inert organic reaction solvent, however, a ketone such as acetone or methyl ethyl ketone or diglyme is preferred. Furthermore, in a preferred embodiment the reaction proceeds at an elevated temperature of the reaction mixture and under the atmosphere of an inert gas such as nitrogen, argon or the like.

Since the chrysanthemic acid moiety of Formula I exhibits both geometric and optical isomerism and since the alcohol moiety can also exhibit geometric isomerism whenever a double bond is present in the 2,3-position, it will be appreciated that the esters of the present invention encompass not only all of the geometric and optical isomers, but also the mixtures thereof too. It should also be appreciated the geometric isomerism can exist where, for example, Y represents a moiety of Formula (a) or (b).

If the salt of chrysanthemum carboxylic acid and the halide of Formula IVa, IVb, IVc or IVd, used in the second described process, are varied the resultant product will vary. Thus using a mixture of the halide or salt starting materials can produce a cis/trans mixture.

As noted, the esters of Formula I are insecticidally active against a variety of insects. These esters are also insecticidally effective when they are synergized with known pyrethrin synergists such as piperonyl butoxide; (1,2-methylene-dioxy)-4-[2 - (octylsulfonyl)-propyl]-benzene, bis-(2,3,3,3-tetrachloropropyl)-ether and the like.

The acid esters of Formula I evidencing a relatively low mammalian toxicity; e.g., 4-phenyl-2-butynyl($\pm$)-cis/trans-2,2-dimethyl-3-(2-methyl-propenyl)-cyclopropane carboxylate;
5-methyl-5-hexen-2-ynyl($\pm$)-cis/trans-2,2-dimethyl-3-(2-methyl-propenyl)-cyclopropane carboxylate;
6-methyl-5-heptene-2-ynyl($\pm$)cis/trans-2,2-dimethyl-3-(2-methyl-propenyl)cyclopropane carboxylate; and
2,5-hexadiynyl($\pm$)-cis/trans - 2,2 - dimethyl-3-(2-methyl-propenyl)-cyclopropane carboxylate—all having a $LD_{50}$ greater than 1600 mg./kg. p.o. in mice and exhibiting insecticidal activity against *Musca domestica* in the order of pyrethrin extract and DDT.

For practical use of the chrysanthemic acid esters of Formula I as insecticides, it is desirable to formulate them as insecticidal compositions comprising, as an active ingredient, an ester and a carrier. Such formulations can be in liquid form (e.g. as a sprayable solution or suspension) or in solid form (e.g. as a dust or a granular formulation), either of which includes therewith an acceptable carrier. As used herein, the term "acceptable carrier" comprehends any substance which can be used to dissolve, disperse or diffuse the ester of Formula I without impairing the effectiveness of the toxic agent and which does not permanently damage the environment in which it is used, e.g. soil, equipment, crops, etc. For example, liquid compositions can be extended with water, and dusts and granular formulations can be extended with inert solid carriers. Where a solid carrier is employed in preparing the insecticidal compositions, such compositions may include talc, finely particled clay, silica or similar powders so long as the solid carriers do not bring about decomposition of the esters. Where, for convenience the esters of Formula I are formulated as liquid compositions, such compositions can include emulsifiers and/or acceptable organic solvents. If desired, the insecticidal compositions can also contain conventional additives such as wetting agents or the like, as well as other insecticides and/or synergists.

An effective amount of the insecticidal composition can be applied to an insect infested area using any conventionally acceptable method such as spraying, dusting, fumigation etc. Desirably, solid formulations and liquid formulations contain from about 0.5 to about 25% by weight of the toxicant comprising a chrysanthemic acid ester of Formula I. Solid and liquid formulations preferably contain from about 1% to about 10% on the same basis. The choice of the concentration of the ester of Formula I and the rate of application to the insect infested area depend of course on several factors, for example maturity of insects present, the type of insecticidal composition used and method of application.

Of course, the insecticidal compositions of this invention may also be concentrates (e.g. wettable powders or emulsion concentrates) suitable for storage or transport and containing, for example, from about 10% to about 80% by weight of a chrysanthemic acid ester of Formula I. These can be diluted with the same or a different carrier to a concentration suitable for application. Emulsion concentrate formulations, for example, can be prepared by dissolving the esters of Formula I in an acceptable organic solvent and adding a solvent-soluble emulsifier. Suitable organic solvents, which are usually water-immiscible, can, for example, be found in the hydrocarbon, chlorinated hydrocarbon, ketone, ester, alcohol and amide classes of organic solvents, and include toluene, xylene, naphthas, perchloroethylene and the like or mixtures thereof; preferably, the solvents are in the aromatic hydrocarbon and ketone classes. Surfactants are useful as emulsifiers and, where used, they suitably constitute from about 5% to about 15% by weight of an emulsion concentrate, preferably, non-ionic surfactants are utilized.

The choice of concentration of the ester of Formula I and the rate of application to the insect infested area depends, of course, on several factors e.g., maturity of insects present, the type of insecticidal composition used and the method of application.

In order to illustrate our invention, the following examples are given wherein the chrysanthemum monocarboxylic acid chloride employed was obtained from the corresponding commercial (±) chrysanthemum carboxylic acid. In each case the particular carboxylic acid used consisted of a cis/trans mixture in the ratio of about 30:70%.

EXAMPLE 1

Preparation of: 5 - methyl - 5 - hexen - 2 - ynyl(±)-cis/trans - 2,2 - dimethyl - 3 - (2 - methyl - propenyl)-cyclopropane carboxylate A solution of 14.0 g. of chrysanthemum monocarboxylic acid chloride in 50 ml. of dry benzene was added dropwise at 20° C. in a nitrogen atmosphere over a period of 0.5 hour to a stirred solution of 9.07 g. of 5-methyl-5 - hexen - 2 - yn - 1 - ol and 11.85 of dry pyridine in 120 ml. of dry benzene. The resulting mixture was stirred at 20° C. in a nitrogen atmosphere for 48 hours, then the precipitated pyridine hydrochloride was filtered off and washed with benzene. The combined filtrate and washings were washed successively with 5 N aqueous hydrochloric acid, 2 N aqueous sodium hydroxide solution, 2 N aqueous hydrochloric acid, saturated aqueous sodium bicarbonate solution and brine, dried over anhydrous sodium sulphate, filtered and evaporated. Distillation yielded: 5 - methyl - 5 - hexen - 2 - ynyl(±) - cis/trans - 2,2 - dimethyl - 3 - (2 - methyl - propenyl)-cyclopropane carboxylate. B.P. 128°–129° C./0.2 mm.; $n_D^{21} = 1.4895$.

EXAMPLE 2

Preparation of: 6-methyl-5-hepten-2-ynyl(±)-cis/trans-2,2 - dimethyl - 3 - (2 - methyl - propenyl) - cyclopropane carboxylate Using the procedure described in Example 1, 6-methyl-5 - hepten-2-ynyl(±)-cis/trans-2,2-dimethyl-3-(2-methyl-propenyl)-cyclopropane carboxylate was prepared from 6-methyl-5-hepten-2-yn-1-ol and chrysanthemum monocarboxylic acid chloride. B.P. 162°–163° C./0.2 mm.; $n_D^{20} = 1.4931$.

EXAMPLE 3

Preparation of: 5,6-dimethyl-5-hepten-2-ynyl(±)-cis/trans-2,2-dimethyl-3-(2-methyl-propenyl)-cyclopropane carboxylate Using the procedure described in Example 1, the ester was prepared from 5,6-dimethyl-5-hepten-2-yn-1-ol and chrysanthemum monocarboxylic acid chloride.

EXAMPLE 4

Preparation of: cis - 2,5 - hexadienyl(±) - cis/trans-2,2 - dimethyl - 3 - (2 - methyl - propenyl) - cyclopropane carboxylate Approximately 1 g. of activated charcoal was added to a solution of 9.6 g. of 5-hexen-2-yn-1-ol in 500 ml. of petroleum ether (B.P. 60–80° C.) and the resulting mixture was warmed under a nitrogen atmosphere for one or two minutes, then immediately filtered. 2.5 g. of Lindlar catalyst (International Encyclopedia of Chemical Science, D. Van Nostrand Co., Inc. 1964; (690) was added to the filtrate with 20 ml. of a 5% solution of quinoline in petroleum ether. The resultant mixture obtained was immediately hydrogenated under atmospheric pressure at 20° C. until the calculated amount of hydrogen had been absorbed. The catalyst was then filtered off and the filtrate was evaporated. The residual syrup was dissolved in 500 ml. of ether and the solution obtained was washed with a saturated solution of sodium chloride in 2 N aqueous hydrochloric acid with brine, dried over anhydrous sodium sulphate and anhydrous potassium carbonate, filtered and evaporated. Distillation yielded: cis-2,5 - hexadien - 1 - ol. (B.P. 68°–69° C./15 mm.; $n_D^{20} = 1.4615$.)

A solution of 14 g. of chrysanthemum monocarboxylic acid chloride in 50 ml. of dry benzene was added dropwise over 0.5 hour, at 20° C., under a nitrogen atmosphere to a stirred solution of 8.1 g. of cis-2,5-hexadien-1-ol and 11.85 g. of dry pyridine in 120 ml. of dry benzene. The resulting mixture was stirred at 20° C. for a further 23 hours, then filtered. The filtrate was washed successively with dilute aqueous hydrochloric acid, 2 N aqueous sodium hydroxide solution, dilute aqueous hydrochloric acid, saturated aqueous sodium bicarbonate solution and brine, dried over anhydrous sodium sulphate, filtered and evaporated. Distillation of the residual syrup yielded: cis - 2,5 - hexadienyl(±) - cis/trans - 2,2-dimethyl-3-(2-methyl-propenyl)-cyclopropane carboxylate. B.P. 95°–99° C./0.25 mm.; $n_D^{20} = 1.4870$.

EXAMPLE 5

Preparation of: trans - 2,5 - hexadienyl (±) cis/trans-2,2 - dimethyl - 3 - (2 - methyl - propenyl) - cyclopropane carboxylate 4 g. of lithium aluminium hydride was added to 400 ml. of dry ether under a nitrogen atmosphere. A solution of 11.5 g. of 5-hexen-2-yn-1-ol in 50 ml. of dry ether was then added over a period of 15 minutes, cooled and then the resulting mixture heated under reflux conditions for 7 hours followed by cooling and slow treated successive additions of 7 ml. of water and 60 ml. of aqueous 2 N sodium hydroxide solution. The precipitate which formed was recovered and a trace of hydroquinone added. Distillation of the residue yielded: trans-2,5-hexadien-1-ol, B.P. 42°–45° C./0.8 mm.; $n_D^{20} = 1.4610$.

Using the procedure described in Example 4, trans-2,5-hexadienyl (±) cis/trans - 2,2 - dimethyl - 3 - (2-methyl-propenyl)cyclopropane carboxylate was prepared from trans-2,5-hexadien-1-ol and chrysanthemum monocarboxylic acid chloride. Distillation in the presence of a trace of hydroquinone yielded trans-2,5-hexadienyl (±) cis/trans - 2,2 - dimethyl - 3 - (2 - methyl - propenyl)-cyclopropane carboxylate. B.P. 120° C./1.0 mm.;

$n_D^{20} = 1.4835$

EXAMPLE 6

Preparation of: 2 - trans - 2,5 - heptadienyl (±) - cis/trans - 2,2 - dimethyl - 3 - (2 - methyl - propenyl)-cyclopropane carboxylate Using the procedure described in Example 4, 2 - trans-2,5 - heptadienyl (±)-cis/trans - 2,2 - dimethyl - 3 - (2- methyl - propenyl) - cyclopropane carboxylate was prepared from 2 - trans - 2,5 - heptadien - 1 - ol and chrysanthemum monocarboxylic acid. B.P. 142° C./0.2 mm.; $n_D^{20}=1.4854$.

EXAMPLE 7

Preparation of: trans - 5 - methyl - 2,5 - hexadienyl (±) - cis/trans - 2,2-dimethyl-3-(2-methylpropenyl)-cyclopropane carboxylate Using the procedure described in Example 4, trans-5-methyl - 2,5 - hexadienyl (±) - cis/trans - 2,2 - dimethyl-3 - (2 - methyl - propenyl) - cyclopropane carboxylate was prepared from trans - 5 - methyl - 2,5 - hexadien - 1-ol and chrysanthemum monocarboxylic acid chloride. B.P. 118°–120° C./0.2 mm.

EXAMPLE 8

Preparation of: 2,5-hexadiynyl (±)-cis/trans-2,2-dimethyl - 3 - (2 - methyl-propenyl)-cyclopropane carboxylate Ethyl magnesium bromide was prepared from 24.2 g. of magnesium and 109 g. of ethyl bromide in 190 ml. of tetrahydrofuran. The resulting solution was filtered and diluted with 300 ml. of tetrahydrofuran. 28.2 g. of redistilled propargyl alcohol were added dropwise over 0.5 hour and the resulting mixture was then heated under reflux for 1.5 hours and then allowed to cool. 1.5 g. of cuprous chloride was added, followed by the addition of a solution of 60 g. of redistilled propargyl bromide in 20 ml. of tetrahydrofuran. The mixture obtained was heated under reflux for 16 hours and the recovered product distilled rapidly in the presence of hydroquinone under an atmosphere of nitrogen. Redistillation yielded: 2,5-hexadiynyl-1-ol. B.P. 68–70° C./0.6 mm. $n_D^{20}=1.5015$.

A solution of 14 g. chrysanthemum monocarboxylic acid chloride in 30 ml. of dry benzene was added to a stirred solution of 7.8 g. of 2.5-hexadiyn-1-ol and 11.85 g. of dry pyridine in 120 ml. of dry benzene. The addition was made dropwise over a 30 minute period and under a nitrogen atmosphere at 20° C. The resulting mixture was stirred under the nitrogen atmosphere for a further period of 64 hours, then the precipitated pyridine hydrochloride was filtered off and washed with benzene. The combined filtrate was washed successively with dilute aqueous hydrochloric acid, 2 N aqueous sodium hydroxide solution, dilute aqueous hydrochloric acid, saturated aqueous sodium bicarbonate solution and brine; and dried over sodium sulphate. Thereafter, several crystals of hydroquinone were added. Distillation of the residue under nitrogen yielded: 2,5 - hexadiynyl (±)-cis/trans-2,2-dimethyl-3-(2-methyl-propenyl)-cyclopropane carboxylate. B.P. 157° to 158° C.; $n_D^{20}=1.4970$.

EXAMPLE 9

Preparation of: 4-phenyl-2-butynyl (±) cis/trans-2,2-dimethyl - 3 - (2 - methyl-propenyl)-cyclopropane carboxylate A crystal of iodine was added to a suspension of 12.2 g. of dry magnesium in 120 ml. of dry ether followed by the addition of 78.5 g. of bromo-benzene dropwise over a period of 45 minutes with stirring and cooling. The mixture was further stirred for 15 minutes at 0°–10° C. and the resulting Grignard solution was separated from the unreacted magnesium dry ether. A solution of 26.3 g. of 4-chloro-2-butyn-1-ol in 20 ml. of dry ether was then added to the stirred Grignard solution over a period of 20 minutes at 20° C., stirred at 20° C. for an additional 45 minutes and heated under gentle reflux for 80 minutes. After cooling the mixture was poured into a saturated aqueous ammonium chloride solution and ice solution and extracted three times with ether. Ether extracts were combined and washed twice with brine, dried over anhydrous sodium sulphate, filtered and evaporated. Distillation of the residue yielded: 4-phenyl-2-butyn-1-ol of boiling point 143°–150° Co/15 mm.; $n_D^{20}=1.5581$.

Using the latter procedure described in Example 8, 4-phenyl - 2 - butynyl (±) cis/trans-2,2-dimethyl-3-(2-methyl-propenyl)-cyclopropane carboxylate was prepared from chrysanthemum monocarboxylic acid chloride and 4 - phenyl - 2 butyn - 1 - ol. B.P. 172°–174' C./0.65 mm.; $n_D^{20}=1.5277$.

EXAMPLE 10

Preparation of: 4-(2-methyl-phenyl)-2-butynyl (±)-cis/trans - 2,2-dimethyl-2-(2-methyl-propyl)-cyclopropane carboxylate Using the procedure described in Example 9, 4-(2-methyl - phenyl) - 2-butynyl (±)-cis/trans-2,2-dimethyl-3-(2-methyl-propyl)-cyclopropane carboxylate was prepared from 4-(2-methyl-phenyl)-2-butyl-1-ol and chrysanthemum monocarboxylic acid chloride. B.P. 190°/200° C./0.9 mm.

EXAMPLE 11

Preparation of: trans-4-phenyl-2-butenyl (±)-cis/trans-2,2 - dimethyl - 3 - (2-methyl-propenyl)-cyclopropane carboxylate Using the procedure described in Example 9, trans-4-phenyl - 2 - butenyl (±)-cis/trans - 2,2-dimethyl-3-(2-methyl-propenyl)-cyclopropane carboxylate, was prepared from trans-4-phenyl-2-buten-1-ol and chrysanthemum monocarboxylic acid chloride. B.P. 168°–170° C./1.4 mm.; $n_D^{20}=1.5200$.

EXAMPLE 12

9.5 g. of the sodium salt of chrysanthemum monocarboxylic acid are ground to a fine powder and dissolved, with stirring, in 400 ml. of diglyme at 100° C. under an atmosphere of nitrogen. 8.65 g. of 1-bromo-5-methyl-hex-5-en-2-yne in 80 ml. of diglyme are added dropwise over a period of 0.25 hour with stirring. The mixture is heated at 150° C. for 88 hours under an atmosphere of nitrogen. The precipitated solids are filtered off and the diglyme is removed under reduced pressure (5 mm. Hg). The residue is treated with water and extracted three times with ether. The ether extracts are combined and washed twice with water, twice with 2 N sodium hydroxide solution and twice with sodium chloride solution and then dried over anhydrous sodium sulfate. After filtration and evaporation of the ether, the residue is distilled to yield 5-methyl-5-hexen-2ynyl (±)-cis/trans-2,2-dimethyl-3-(2-methylpropenyl)-cyclopropane carboxylate of boiling point 145–151° C./1.0 mm. (bath temperature 170° C.); $n_D^{20}=1.4920$.

EXAMPLE 13

7.2 g. of the sodium salt of chysanthemum monocarboxylic acid are finely powdered and suspended in 400 ml. of diglyme. A solution of 6.3 g. of 1-chloro-4-phenyl-2-butyne in 50 ml. of diglyme is added and the mixture is stirred and heated in an oil bath at 140° C. under a nitrogen atmosphere for 100 hours. The precipitated sodium chloride is filtered off and the diglyme is removed under reduced pressure. The residue is treated with water and extracted three times withe 150 ml. of ether each time. The ether extracts are combined, washed successively with 2 N sodium hydroxide solution, water and sodium chloride solution and then dried over sodium sulfate. The solution is then filtered, evaporated and the residue distilled. 5.1 g. of a product of boiling range 112°–150° C./1.0–0.8 mm. (bath temperature 185° C.) are obtained. Purification of this product by chromatography on aluminum oxide using petroleum ether (boiling range 40°–60° C.) as the eluant yielded 3.3 g. of 4-phenyl-2-butynyl (±) - cis/trans - 2,2 - dimethyl-3 - (2-methyl-propenyl)-cyclopropane carboxylate;

$n_D^{20} = 1.5285$

EXAMPLE 14

2.5 g. of 5-methyl-5-hexen-2-ynyl (±)-cis/trans-2,2-dimethyl-3-(2-methyl-propenyl) - cyclopropane carboxylate were dissolved in sufficient kerosene to give a final volume of 100 ml. The resulting solution was suitable for use as a spray.

Similar solutions were prepared in an analogous manner from cis-2,5-hexadienyl (±)-cis/trans-2,2-dimethyl-3-(2-methylpropenyl)-cyclopropane carboxylate, from 2,5-hexadiynyl (±)-cis/trans-2,2 - dimethyl - 3 - (2 - methylpropenyl)-cyclopropane carboxylate and from 4-phenyl-2-butynyl (±)-cis/trans-2,2-dimethyl-3-(2 - methyl - propenyl)-cyclopropane carboxylate.

EXAMPLE 15

20 g. of 5-methyl-5-hexen-2-ynyl (±)-cis/trans-2,2-dimethyl-3-(2-methyl-propenyl) - cyclopropane carboxylate, 10 g. of nonoxylon-15 (a non-ionic surfactant) and 70 g. of xylene were thoroughly mixed to give a solution which could be used as an emulsifiable concentrate.

Similar emulsifiable concentrates were prepared in an analogous manner from cis-2,5-hexadienyl (±)-cis/trans-2,2-dimethyl-3-(2-methyl - propenyl) - cyclopropane carboxylate, from 2,5-hexadiynyl (±) - cis/trans - 2,2 - dimethyl-3-(2-methyl-propenyl) - cyclopropane carboxylate and from 4-phenyl-2-butynyl (±)-cis/trans-2,2-dimethyl-3-(2-methyl-propenyl)-cyclopropane carboxylate.

Before use, the emulsifiable concentrates are emulsified in sufficient water to give a ten-fold dilution.

EXAMPLE 16

5 g. of 5-methyl-5-hexen-2-ynyl (±)-cis/trans-2,2-dimethyl-3-(2-methyl-propenyl) - cyclopropane carboxylate were well mixed with 5 g. of lignin sulphonate and 90 g. of kaolin. The mixture was thoroughly stirred in a mortar while 10 ml. of water were added, then the moist mixture was further stirred and subsequently granulated in a granulator. After drying in air there were obtained granules containing 5% of active ingredient.

Similar granules were obtained in analogous manner from cis-2,5-hexadienyl (±)-cis/trans - 2,2 - dimethyl-3-(2-methyl-propenyl) - cyclopropane carboxylate, from 2,5 - hexadiynyl (±) - cis/trans-2,2 - dimethyl - 3 - (2-methyl propenyl)-cyclopropane carboxylate and from 4-phenyl-2-butynyl (±)-cis/trans - 2,2 - dimethyl - 3 - (2-methyl-propenyl)-cyclopropane carboxylate.

EXAMPLE 17

15 g. of 5-methyl-5-hexen-2-ynyl (±)-cis/trans-2,2- dimethyl-3-(2-methyl-propenyl) - cyclopropane carboxylate were well mixed with 80 g. of a mixture of diatomaceous earth and kaolin and 5 g. lignin sulphonate. The resulting mixture is crushed to the desired degree of fineness to give a 15% wettable powder which when dispersed in an appropriate amount of water can be applied by spraying.

Similar wettable powders were obtained in analogous manner from cis-2,5-hexadienyl (±)-cis/trans-2,2-dimethyl-3-(2-methyl-propenyl)-cyclopropane carboxylate, from 2,5-hexadiynyl (±)-cis/trans - 2,2 - dimethyl-3-(2-methyl-propenyl)-cyclopropane carboxylate and from 4-phenyl-2-butynyl (±)-cis/trans-2,2-dimethyl-3-(2-methyl - propenyl)-cyclopropane carboxylate.

EXAMPLE 18

2.5 g. of 5-methyl-5-hexen-2-ynyl (±)-cis/trans-2,2-dimethyl-3-(2-methyl - propenyl)-cyclopropane carboxylate were dissolved in 20 ml. of acetone. 97.5 g. of 300-mesh diatomaceous earth added to the solution and the resulting mixture was thoroughly stirred in a mortar. Acetone was then evaporated off to give a 2.5% dust formulation.

Similar dust formulations were obtained in analogous manner from cis-2,5-hexadienyl (±)-cis/trans-2,2-dimethyl-3-(2-methyl - propenyl)-cyclopropane carboxylate, from 2,5-hexadiynyl (±)-cis/trans - 2,2 - dimethyl-3-(2-methyl-propenyl)-cyclopropane carboxylate and from 4-phenyl-2-butynyl (±)-cis/trans-2,2-dimethyl-3-(2-methyl-propenyl)-cyclopropane carboxylate.

EXAMPLE 19

Field-bean seedlings each infested with approximately 50–100 black bean aphids (*Aphis fabae*) are sprayed with acetone solutions of the active material. The plants are placed singly in tubes in water. 24 and 48 hours after application the dead and surviving aphids are counted and the $LD_{50}$ of the active material is calculated. This $LD_{50}$ is expressed as $\log_{10}$ of the concentration of the acetone solution in g./cm.$^3$.

Results:

Active material: $\log_{10} LD_{50}$

4 - phenyl-2-butynyl (±)-cis/trans-2,2-dimethyl-2-(2-methyl-propenyl)-cyclopropane carboxylate ------------------------------- −4.5

Trans-4-phenyl-2-butenyl (±)-cis/trans-2,2-dimethyl-2 - (2 - methyl-propenyl) - cyclopropane carboxylate ---------------------- −4.9

5,6 - dimethyl-5-hepten-2-ynyl (±)-cis/trans-2,2-dimethyl-3-(2-methyl - propenyl)-cyclopropane carboxylate -------------------- −3.0

2,5 - hexadiynyl (±)-cis/trans-2,2-dimethyl-3-(2-methyl-propenyl)-cyclopropane carboxylate --------------------------------- −3.6

EXAMPLE 20

Petri dishes are sprayed with an acetone solution of the active material. 2–3 hours after application, 10 house flies (*Musca domestica*), 4–5 days old, are put into each dish. The flies are examined 1, 3 and 24 hours later to ascertain whether they are dead or paralysed and the $LD_{50}$ of the active material is calculated. This $LD_{50}$ is expressed as $\log_{10}$ of the concentration of the acetone solution in g./cm.$^3$.

Results:

Active material: $\log_{10} LD_{50}$ 5,6-dimethyl-5-hepten - 2 - ynyl (±)-cis/trans-2,2-dimethyl-3-(2-methyl - propenyl)-cyclopropane carboxylate -------------------- −4.0

Trans 5-methyl-2,5-hexadienyl (±)-cis/trans-2,2-dimethyl-3-(2-methyl - propenyl)-cyclopropane carboxylate -------------------- −4.3

6-methyl-5-hepten-2-ynyl (±)-cis/trans-2,2-dimethyl - 3 - (2 - methyl-propenyl)-cyclopropane carboxylate ---------------------- −5.1

2,5 - hexadiynyl (±)-cis/trans-2,2-dimethyl-3-(2-methyl-propenyl)-cyclopropane carboxylate --------------------------------- −5.0

4 - phenyl-2-butynyl (±)-cis/trans-2,2-dimethyl-3-(2-methyl-propenyl)-cyclopropane carboxylate --------------------- *−5.3 or −6.2

4-(2-methyl - phenyl)-2-butynyl (±)-cis/trans 2,2-dimethyl-3-(2-methyl - propenyl)-cyclopropane carboxylate -------------------- −3.0

Trans-4-phenyl-2-butenyl (±)-cis/trans-2,2-dimethyl - 3 - (2 - methyl-propenyl)-cyclopropane carboxylate ---------------------- −4.5

*Synergised by a 10:1 proportion of piperonyl butoxide.

EXAMPLE 21

Bean leaf discs each with a two-day old infestation of 20–40 spider mites (*Tetranychus urticae*) are sprayed with an acetone solution of the active material. Two days after application an assessment is made of the dead spider mites on the discs and after 6 days an assessment of the dead spider mites and of the eggs killed. The LD$_{50}$ of the active material is calculated. This LD$_{50}$ is expressed as log$_{10}$ of the concentration of the acetone solution in g./cm.$^3$.
Results:

| Active material: | Log$_{10}$ LD$_{50}$ |
|---|---|
| 6-methyl-5-hepten-2-ynyl (±)-cis/trans-2,2-dimethyl-3-(2-methyl-propenyl)-cyclopropane carboxylate | [1]—3 or —4 |
| 2,5-hexadienyl (±)-cis/trans-2,2-dimethyl-3-(2-methyl-propenyl)-cyclopropane carboxylate | —3 |
| 4-phenyl-2-butynyl (±)-cis/trans-2,2-dimethyl-3-(2-methyl-propenyl)-cyclopropane carboxylate | [2]—4.5 |

[1] Synergised by a 10:1 proportion of piperonyl butoxide.
[2] Synergised by a 10:1 proportion of bis-(2,3,3,3-tetrachloropropyl)-ether.

EXAMPLE 22

Groups of three apple calottes are sprayed with an acetone solution of the active material. Approximately 0.5 hour after application, 10 newly hatched caterpillars of the codlin moth (*Carpocapsa pomonella*) are placed on each group of calottes (distributed 3, 3, 4). Three days later the number of places where the caterpillars have struck is counted and 6 days later the number of live caterpillars in the calottes is determined. The LD$_{50}$ of the active material is calculated. This LD$_{50}$ is expressed as log$_{10}$ of the concentration of the acetone solution in g./cm.$^3$.
Results:

| Active material: | log$_{10}$ LD$_{50}$ |
|---|---|
| 5,6 - dimethyl-5-hepten-2-ynyl (±)-cis/trans 2,2-dimethyl-3-(2-methyl-propenyl)-cyclopropane carboxylate | —3.0 |
| 2,5 - hexadiynyl (±)-cis/trans-2,2-dimethyl-3-(2-methyl-propenyl)-cyclopropane carboxylate | —3.0 |
| 4 - phenyl-2-butynyl (±) - cis-trans-2,2-dimethyl - 3 - (2-methyl-propenyl)-cyclopropane carboxylate | —3.5 |
| 4 - (2-methyl-phenyl) - 2 - butynyl (±)-cis/trans-2,2-dimethyl - 3 - (2-methyl-propenyl)-cyclopropane carboxylate | —4.3 |
| Trans 4-phenyl-2-butenyl (±)-cis/trans-2,2-dimethyl - 3 - (2-methyl-propenyl)-cyclopropane carboxylate | —3.5 |

EXAMPLE 23

Groups of three potato leaf discs (diameter 24 mm.) are sprayed on one side with an acetone solution of the active material. Approximately 0.5 hour after application, 10 Colorado beatle (*Leptinotarsa decemlineata*) larvae (L 1–2) are put onto each group of discs (distribution: 3, 3, 4) which are then put into a plastic cage. Counts of the damaged larvae are made 24 and 48 hours later, the treated leaf discs being replaced by untreated discs at the first count. The LD$_{50}$ of the active material is calculated. This LD$_{50}$ is expressed as log$_{10}$ of the concentration of the acetone solution in g./cm.$^3$.
Results:

| Active material: | log$_{10}$ LD$_{50}$ |
|---|---|
| 5,6 - dimethyl - 5 - hepten-2-ynyl (±)-cis/trans-2,2-dimethyl - 3 - (2-methyl-propenyl)-cyclopropane carboxylate | —3.0 |
| 4 - phenyl - 2 - butyl (±) - cis/trans-2,2-dimethyl - 3 - (2-methyl-propenyl)-cyclopropane carboxylate | [1]—4.5 |

[1] Synergised by a 10:1 ratio of bis-(2,3,3,3-tetrachloropropyl)-ether.

What is claimed is:

1. A chrysanthemic acid ester of the formula

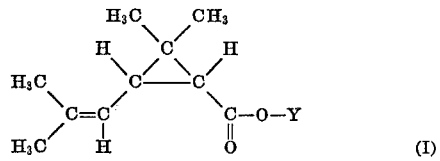

(I)

wherein Y is a moiety selected from the group consisting of

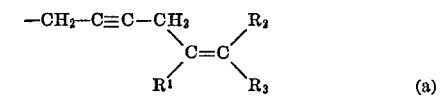    (a)

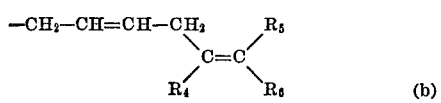    (b)

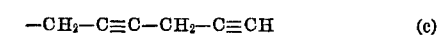    (c)

and

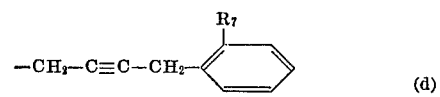    (d)

wherein $R^1$, $R_2$, $R_3$, $R_4$, $R_5$, $R_6$ and $R_7$ is each independently selected from the group consisting of a hydrogen atom and lower alkyl, at least one of $R^1$, $R_2$ and $R_3$ being other than hydrogen.

2. The chrysanthemic acid ester of claim 1 wherein $R_4$, $R_5$ and $R_6$ is each independently selected from the group consisting of a hydrogen atom and a methyl group.

3. The chrysanthemic acid ester of claim 1 wherein $R_7$ is selected from the group consisting of a hydrogen atom and a methyl group.

4. The chrysanthemic acid ester of claim 1 which is 5-methyl-5-hexen-2-ynyl (±)-cis/trans-2,2-dimethyl-3-(2-methyl-propenyl)-cyclopropane carboxylate.

5. The chrysanthemic acid ester of claim 1 which is 6-methyl-5-hepten-2-ynyl (±) - cis/trans-2,2-dimethyl-3-(2-methylpropenyl)-cyclopropane carboxylate.

6. The chrysanthemic acid ester of claim 1 which is 5,6-dimethyl-5-hepten-2-ynyl (±)-cis/trans - 2,2-dimethyl-3-(2-methyl-propenyl)-cyclopropane carboxylate.

7. The chrysanthemic acid ester of claim 1 which is cis-2,5-hexadienyl (±)-cis/trans - 2,2-dimethyl-3-(2-methyl-propenyl)-cyclopropane carboxylate.

8. The chrysanthemic acid ester of claim 1 which is trans - 2,5 - hexadienyl (±)-cis/trans - 2,2 - dimethyl-3-(2-methyl-propenyl)cyclopropane carboxylate.

9. The chrysanthemic acid ester of claim 1 which is 2-trans-2,5 - heptadienyl (±) - cis/trans - 2,2 - dimethyl-3-(2-methyl-propenyl)-cyclopropane carboxylate.

10. The chrysanthemic acid ester of claim 1 which is trans - 5 - methyl - 2,5 - hexadienyl (±) - cis/trans-2,2-dimethyl - 3 - (2-methyl-propenyl) - cyclopropane carboxylate.

11. The chrysanthemic acid ester of claim 1 which is 2,5 - hexadiynyl (±) - cis/trans - 2,2-dimethyl-3-(2-methyl-propenyl)-cyclopropane carboxylate.

12. The chrysanthemic acid ester of claim 1 which is 4-phenyl-2-butynyl (±) - cis/trans - 2,2 - dimethyl-3-(2-methyl-propenyl)-cyclopropane carboxylate.

13. The chrysanthemic acid ester of claim 1 which is trans-4-phenyl-2-butenyl (±) - cis/trans - 2,2 - dimethyl-3-(2-methyl-propenyl)-cyclopropane carboxylate.

14. The chrysanthemic acid ester of claim 1 which is 4-(2-methyl-phenyl) - 2 - butynyl (±) - cis/trans-2,2-dimethyl-propenyl)-cyclopropane carboxylate.

15. The chrysanthemic acid ester of claim 1 which is cis/trans - 5 - hepten - 2 - ynyl (±)-cis/trans-2-dimethyl-3(2-methyl-propenyl)-cyclopropane carboxylate.

16. The chrysanthemic acid ester of claim 1 which is 2,5 - heptadiynyl (±) - cis/trans - 2,2 - dimethyl-3-(2-methyl - propenyl) - cyclopropenyl) - cyclopropane carboxylate.

17. The chrysanthemic acid ester of claim 1 which is 4-(3,4-dimethyl-phenyl) - 2 - butynyl (±)-cis/trans-2,2-dimethyl - 3 - (2-methyl-propenyl) - cyclopropane carboxylate.

18. The chrysanthemic acid ester of claim 1 which is 4-(4-methyl-phenyl) - 2 - butynyl (±) - cis/trans-2,2-dimethyl - 3 - (2 - methyl-propenyl) - cyclopropane carboxylate.

19. The chrysanthemic acid ester of claim 1 which is 4-(3-methyl-phenyl) - 2 - butynyl (±)-cis/trans-2,2-dimethyl - 3 - (2 - methyl - propenyl) - cyclopropane carboxylate.

References Cited
UNITED STATES PATENTS 3,285,950   11/1966   Weber _____ 260—468

LORRAINE A. WEINBERGER, Primary Examiner

R. GERSTL, Assistant Examiner

U.S. Cl. X.R.

260—618 E, 618 R, 632 R, 632 Y, 651 R, 654 R; 424—306